US012809585B2

(12) United States Patent
Yu et al.

(10) Patent No.: US 12,809,585 B2
(45) Date of Patent: Nov. 24, 2026

(54) APPARATUS AND METHOD WITH MULTI-FORMAT DATA SUPPORT

(71) Applicant: SAMSUNG ELECTRONICS CO., LTD., Suwon-si (KR)

(72) Inventors: Hyeongseok Yu, Seoul (KR); Donghyuk Kwon, Seoul (KR); Channoh Kim, Suwon-si (KR); Seongwook Park, Seoul (KR); Yeongon Cho, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1118 days.

(21) Appl. No.: 17/883,987

(22) Filed: Aug. 9, 2022

(65) Prior Publication Data

US 2023/0065528 A1 Mar. 2, 2023

(30) Foreign Application Priority Data

Aug. 31, 2021 (KR) ........................ 10-2021-0115470
May 30, 2022 (KR) ........................ 10-2022-0066180

(51) Int. Cl.
*G06F 7/544* (2006.01)
*G06F 7/483* (2006.01)
*G06F 7/487* (2006.01)

(52) U.S. Cl.
CPC ............ *G06F 7/5443* (2013.01); *G06F 7/483* (2013.01); *G06F 7/4876* (2013.01); *G06F 2207/382* (2013.01); *G06F 2207/3824* (2013.01)

(58) Field of Classification Search
CPC ....... G06F 2207/382; G06F 2207/3824; G06F 7/483; G06F 7/487; G06F 7/5443; H03M 7/14; H03M 7/24
See application file for complete search history.

(56) References Cited

U.S. PATENT DOCUMENTS 6,564,238 B1 * 5/2003 Kim ...................... G06F 7/5443 708/490
8,275,822 B2 9/2012 Olofsson et al.
(Continued)

FOREIGN PATENT DOCUMENTS

EP 3 396 524 A1 10/2018
KR 10-1614215 B1 4/2016
(Continued)

OTHER PUBLICATIONS

D.A. Patterson et al., Computer Organization and Design: the Hardware/Software Interface, Elsevier Science & Technology, 2007 ( Year: 2007).*
(Continued)

*Primary Examiner* — Emily E Larocque
(74) *Attorney, Agent, or Firm* — NSIP Law

(57) ABSTRACT

An apparatus with multi-format data support includes: a receiver configured to receive a plurality of data corresponding to a plurality of data formats; one or more processors configured to: multiply the plurality of data using one or more multipliers; perform a first alignment on a result of the multiplication based on an exponent value of the plurality of data; add a result of the first alignment; and perform a second alignment on a result of the addition based on the exponent value and an operation result of a previous cycle.

20 Claims, 14 Drawing Sheets

(56) References Cited

U.S. PATENT DOCUMENTS

| | | | |
|---|---|---|---|
| 8,301,576 B2 | 10/2012 | Meng et al. | |
| 9,710,265 B1 | 7/2017 | Temam et al. | |
| 10,096,134 B2 | 10/2018 | Yan et al. | |
| 10,726,514 B2 * | 7/2020 | Ould-Ahmed-Vall | G06T 1/20 |
| 12,197,887 B2 * | 1/2025 | DiCecco | G06F 7/5443 |
| 2016/0328647 A1 | 11/2016 | Lin et al. | |
| 2017/0046153 A1 | 2/2017 | Mahurn | |
| 2017/0193361 A1 | 7/2017 | Chilimbi et al. | |
| 2022/0269950 A1 | 8/2022 | Lee | |

FOREIGN PATENT DOCUMENTS

| | | |
|---|---|---|
| KR | 10-2019-0005043 A | 1/2019 |
| KR | 10-2020-0057475 A | 5/2020 |
| KR | 10-2021-0065625 A | 6/2021 |

OTHER PUBLICATIONS

A. Garofalo et al., XpulpNN: Accelerating Quantized Neural Networks on RISC-V Processors Through ISA Extensions, EDAA 2020 (Year: 2020).*

Abdel-Aziz, Hamzah et al., “Rethinking Floating Point Overheads for Mixed Precision DNN Accelerators,” arXiv: 2101.11748v1, Jan. 2021, (17 Pages in English).

Extended European Search Report Issued on Jan. 23, 2023, in counterpart European Patent Application No. 22193160.3 (9 Pages in English).

* cited by examiner

APPARATUS AND METHOD WITH MULTI-FORMAT DATA SUPPORT

CROSS-REFERENCE TO RELATED APPLICATIONS

This application claims the benefit under 35 USC § 119(a) of Korean Patent Application No. 10-2021-0115470, filed on Aug. 31, 2021, and Korean Patent Application No. 10-2022-0066180, filed on May 30, 2022, in the Korean Intellectual Property Office, the entire disclosures of which are incorporated herein by reference for all purposes.

BACKGROUND

1. Field

The following description relates to an apparatus and method with multi-format data support.

2. Description of Related Art

To support an operation of multi-format data, a method of individually providing an operation apparatus corresponding to a multi-format according to a format of data or concatenating, to an output, and thereby outputting a plurality of sub-type data by distributing an input of an operation apparatus that supports a maximum data type, may be used.

In the case of performing an operation on floating point data, a floating point adder used for accumulation may require a long processing time. Therefore, a data hazard issue according to a pipeline may occur in a high-speed operation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an apparatus with multi-format data support includes: a receiver configured to receive a plurality of data corresponding to a plurality of data formats; and one or more processors configured to: multiply the plurality of data using one or more multipliers; perform a first alignment on a result of the multiplication based on an exponent value of the plurality of data; add a result of the first alignment; and perform a second alignment on a result of the addition based on the exponent value and an operation result of a previous cycle.

For the multiplying, the one or more processors may be configured to: multiply a first bit input and a second bit input included in the plurality of data; convert a sign of a result of the multiplication of the first bit input and the second bit input; and combine the result of the multiplication of the first bit input and the second bit input with the converted sign to generate the result of the multiplying of the plurality of data.

For the multiplying, the one or more processors may be configured to multiply a plurality of first bit inputs of the plurality of data.

The one or more processors may be configured to: add the exponent value; obtain a maximum exponent value based on the exponent value; determine a sum of remaining exponent values; and determine a difference between the maximum exponent value and the sum.

For the performing of the first alignment, the one or more processors may be configured to shift the result of the multiplication based on a difference between a maximum exponent value obtained based on the exponent value and a sum of remaining exponent values.

For the performing of the second alignment, the one or more processors may be configured to shift the result of the addition based on a maximum exponent value obtained based on the exponent value and the operation result of the previous cycle.

For the shifting of the result of the addition, the one or more processors may be configured to shift the result of the addition based on a difference between the maximum exponent value and an exponent value stored according to the operation result of the previous cycle.

For the performing of the second alignment, the one or more processors may be configured to: extend a sign bit of the plurality of data based on a predetermined radix point; and add the extended sign bit to the exponent value.

The one or more processors may be configured to accumulate a result of the second alignment.

The one or more processors may be configured to: remove a sign bit with a predetermined length from an output of a result of the accumulation; and perform normalization on the output in which the sign bit is removed.

The one or more processors may include: one or more multipliers configured to perform the multiplying of the plurality of data; a first aligner configured to perform the first alignment on a result of the multiplication; an adder tree configured to perform the adding of the result of the first alignment; and a second aligner configured to perform the second alignment on the result of the addition.

In another general aspect, a processor-implemented method with multi-format data support includes: receiving a plurality of data corresponding to a plurality of data formats; multiplying the plurality of data using one or more multipliers; performing a first alignment on a result of the multiplication of the plurality of data based on an exponent value of the plurality of data; adding a result of the first alignment; and performing a second alignment on a result of the addition based on the exponent value and an operation result of a previous cycle.

The multiplying may include: multiplying a first bit input and a second bit input included in the plurality of data; converting a sign of a result of the multiplication of the first bit input and the second bit input; and combining the result of the multiplication of the first bit input and the second bit input with the converted sign to generate the result of the multiplying of the plurality of data.

The multiplying may include multiplying a plurality of first bit inputs of the plurality of data.

The method may include: adding the exponent value; obtaining a maximum exponent value based on the exponent value; determining a sum of remaining exponent values; and determining a difference between the maximum exponent value and the sum.

The performing of the first alignment may include shifting the result of the multiplication based on a difference between a maximum exponent value obtained based on the exponent value and a sum of remaining exponent values.

The performing of the second alignment may include shifting the result of the addition based on a maximum exponent value obtained based on the exponent value and the operation result of the previous cycle.

The shifting of the result of the addition may include shifting the result of the addition based on a difference between the maximum exponent value and an exponent value stored according to the operation result of the previous cycle.

The performing of the second alignment may include: extending a sign bit of the plurality of data based on a predetermined radix point; and adding the extended sign bit to the exponent value.

The method may include accumulating a result of the second alignment.

The method may include: removing a sign bit with a predetermined length from an output of a result of the accumulation; and performing normalization on the output in which the sign bit is removed.

In another general aspect, one or more embodiments include a non-transitory computer-readable storage medium storing instructions that, when executed by one or more processors, configure the one or more processors to perform any one, any combination, or all operations and methods described herein.

In another general aspect, an apparatus with multi-format data support includes: one or more processors configured to: multiply a plurality of data corresponding to a plurality of data formats using one or more multipliers; perform a first alignment on a result of the multiplication based on a difference between a maximum exponent value among exponent values of the plurality of data and a sum of remaining exponent values; add a result of the first alignment; and perform a second alignment on a result of the addition based on a difference between the maximum exponent value and an exponent value of an operation result of a previous cycle.

The first alignment may include a right-shift and the second alignment may include a left-shift.

The one or more processors may be configured to: add a predetermined value to an exponent value of an output of a result of an accumulation of a result of the second alignment; and perform normalization on the output in which the sign bit is removed.

In another general aspect, an apparatus with multi-format data support includes: one or more processors configured to: multiply the plurality of data by routing data of a plurality of data corresponding to a plurality of data formats to one or more corresponding multipliers of a multiplier-accumulator (MAC) array determined based on the plurality of data formats; perform a first alignment on a result of the multiplication based on an exponent value of the plurality of data;

add a result of the first alignment; and perform a second alignment on a result of the addition based on the exponent value and an operation result of a previous cycle.

The multipliers of the MAC array comprise a plurality of multipliers corresponding a larger bit input and another multiplier corresponding to a smaller bit input.

Other features and aspects will be apparent from the following detailed description, the drawings, and the claims.

Figure 1A:
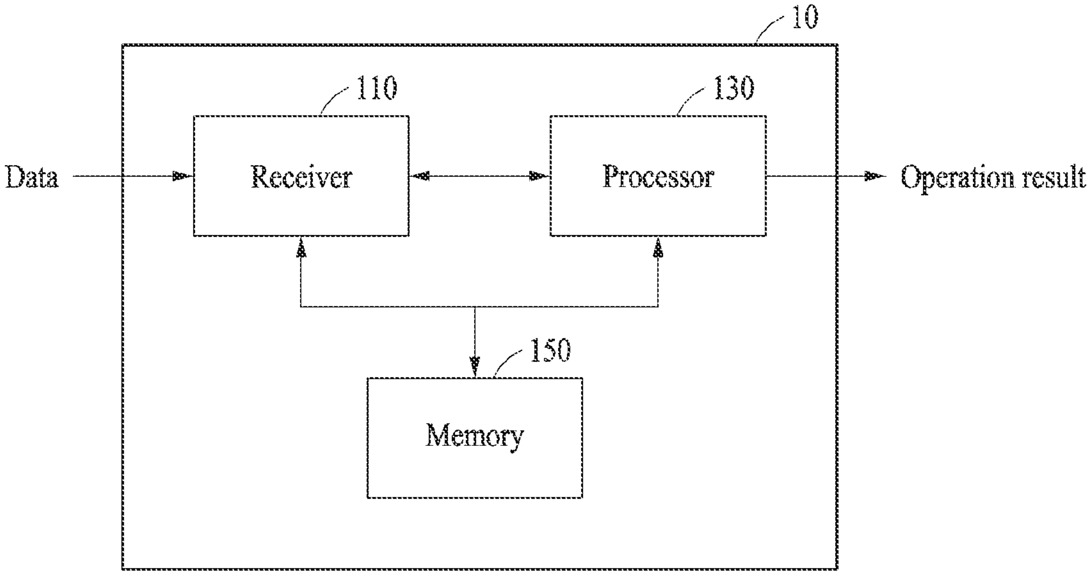
FIG. 1A is a diagram illustrating an example of an operation apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art, after an understanding of the disclosure of this application, may be omitted for increased clarity and conciseness.

Although terms of "first," "second," and the like are used to explain various members, components, regions, layers, or sections, these members, components, regions, layers, or sections are not limited to such terms. Rather, these terms are used only to distinguish one member, component, region, layer, or section from another member, component, region, layer, or section. For example, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only and is not to be limiting of the present disclosure. As used herein, the singular forms "a", "an", and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, integers, steps, operations, elements, components, numbers, and/or combinations thereof, but do not preclude the presence or addition of one or more other features, integers, steps, operations, elements, components, numbers, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined herein, all terms used herein including technical or scientific terms have the same meanings as those generally understood by one of ordinary skill in the art to which this disclosure pertains after and understanding of the present disclosure. Terms defined in dictionaries generally used should be construed to have meanings matching contextual meanings in the related art and the present disclosure, and are not to be construed as an ideal or excessively formal meaning unless otherwise defined herein.

Hereinafter, the examples are described in detail with reference to the accompanying drawings. Like reference numerals illustrated in the respective drawings refer to like elements and further description related thereto is omitted.

Figure 1B:
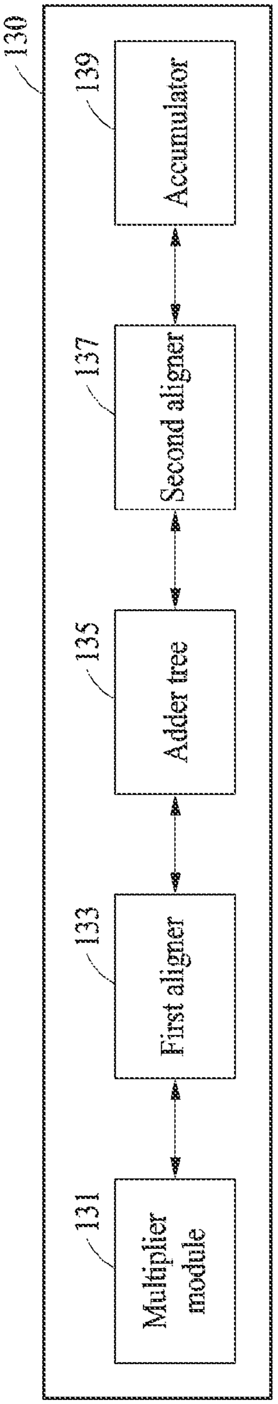
FIG. 1B is a diagram illustrating an example of a processor.

FIG. 1A is a diagram illustrating an example of an operation apparatus, and FIG. 1B is a diagram illustrating an example of a processor.

Referring to FIGS. 1A and 1B, an operation apparatus 10 may perform an operation on multi-format data. The multi-format data may include data of multiple formats. For example, the multi-format data may include floating point data and/or fixed point data of any bit length. The operation apparatus 10 may process an operation using a neural network.

The neural network may refer to an overall model having a problem solution capability in such a manner that nodes forming a network through a synaptic combination change bonding strength of connections through learning. While the network may be referred to as "neural" network, such reference is not intended to impart any relatedness with respect to how the network computationally maps or thereby intuitively recognizes information and how a biological brain operates. I.e., the term "neural network" is merely a term of art referring to the hardware-implemented network.

A node of the neural network may include a combination of weights or biases. The neural network may include a layer including neurons or nodes. The neural network may infer a result desired to be predicted from an arbitrary input by changing a weight of a node through learning.

The neural network may include a deep neural network. The neural network may include a convolutional neural network (CNN), a recurrent neural network (RNN), a perceptron, a multilayer perceptron, a feed forward (FF), a radial basis network (RBN), a deep feed forward (DFF), a long short term memory (LSTM), a gated recurrent unit (GRU), an auto encoder (AE), a variational auto encoder (VAE), a denoising auto encoder (DAE), a sparse auto encoder (SAE), a Markov chain (MC), a Hopfield network (HN), a Boltzmann machine (BM), a restricted Boltzmann machine (RBM), a deep belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differentiable neural computer (DNC), a neural turning machine (NTM), a capsule network (CN), a Kohonen network (KN), and/or an attention network.

The operation apparatus 10 may be implemented as or in a personal computer (PC), a data server, and/or a portable device.

The portable device may be implemented as a laptop computer, a mobile phone, a smart phone, a tablet PC, a mobile Internet device (MID), a personal digital assistant (PDA), an enterprise digital assistant (EDA), a digital still camera, a digital video camera, a portable multimedia player (PMP), a personal navigation device or a portable navigation device (PND), a handheld game console, an e-book, and/or a smart device. The smart device may be implemented as a smart watch, a smart band, and/or a smart ring.

The operation apparatus 10 of one or more embodiments may maintain precision, may improve operation efficiency, and may support various types of data formats. The operation apparatus 10 of one or more embodiments may remove a performance degradation factor in a floating point multiply-accumulation and may enable a high-performance, high-precision neural processor application by smoothly performing a trade-off between a performance and a precision of an application stage. The operation apparatus 10 may support multiple data formats and reduce a data hazard by a latency occurring in floating point accumulation.

The operation apparatus 10 of one or more embodiments may perform a one-cycle operation without supporting of postprocessing and performance loss by providing a feedback loop having a shorter latency and a simple structure through a pseudo-floating addition with a fixed radix point through a second alignment, for example, a global alignment, and an exponent update.

When packing a partial accumulation result, the operation apparatus 10 may reduce a large shifter using a coarse normalization and may configure further simple operation hardware accordingly. Depending on examples, the operation apparatus 10 may modify and implement even a 1-bit unit normalization. Even in this case, simplification of reloading and packing may be maintained.

The operation apparatus 10 may include a receiver 110, a processor 130 (e.g., one or more processors), and a memory 150 (e.g., one or more memories).

The receiver 110 may receive and/or store a plurality of data corresponding to a plurality of data formats. The receiver 110 may include a receiving interface and may output the plurality of data to the processor 130.

The processor 130 may process data stored in the memory 150 and/or received from the receiver 110. The processor 130 may execute a computer-readable code (e.g., software) stored in the memory 150 and instructions induced by the processor 130.

The processor 130 may refer to a data processing device implemented as hardware having, for example, circuitry in a physical structure for executing desired operations. For example, the desired operations may be performed by a code or instructions included in a program.

For example, the data processing device implemented as hardware may include a microprocessor, a central processing unit, a processor core, a multi-core processor, a multiprocessor, an application-specific integrated circuit (ASIC), and a field programmable gate array (FPGA).

The processor 130 may include a multiplier module 131, a first aligner 133, an adder tree 135, and a second aligner 137. The processor 130 may further include an accumulator 139, an exponent module (not shown), and a custom formatter (not shown).

The multiplier module 131 may include at least one multiplier configured to multiply the plurality of data. The multiplier module 131 may include a first multiplier, a second multiplier, a sign converter, and a combiner.

The first multiplier and the second multiplier may multiply data. The first multiplier and the second multiplier may multiply bit inputs of lengths.

The first aligner 133 and the second aligner 137 may align input data. The first aligner 133 and the second aligner 137 may align data by shifting stored data by a bit number.

The adder tree 135 may include a plurality of adders configured in a tree structure. The adder tree 135 may add input data using a plurality of adders.

The accumulator 139 may accumulate input data.

The memory 150 may store data for an operation or an operation result. The memory 150 may store instructions or a program executable by the processor 130. For example, the instructions may include instructions for executing an operation of the processor 130 and/or an operation of each component of the processor 130.

The memory 150 may be implemented as a volatile memory device or a non-volatile memory device.

The volatile memory device may be implemented as a dynamic random access memory (DRAM), a static random access memory (SRAM), a thyristor RAM (T-RAM), a zero capacitor RAM (Z-RAM), or a twin transistor RAM (TTRAM).

The non-volatile memory device may be implemented as an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM)), a nano floating gate memory (NFGM), a holographic memory, a molecular electronic memory device, or an insulator resistance change memory.

Figure 2:
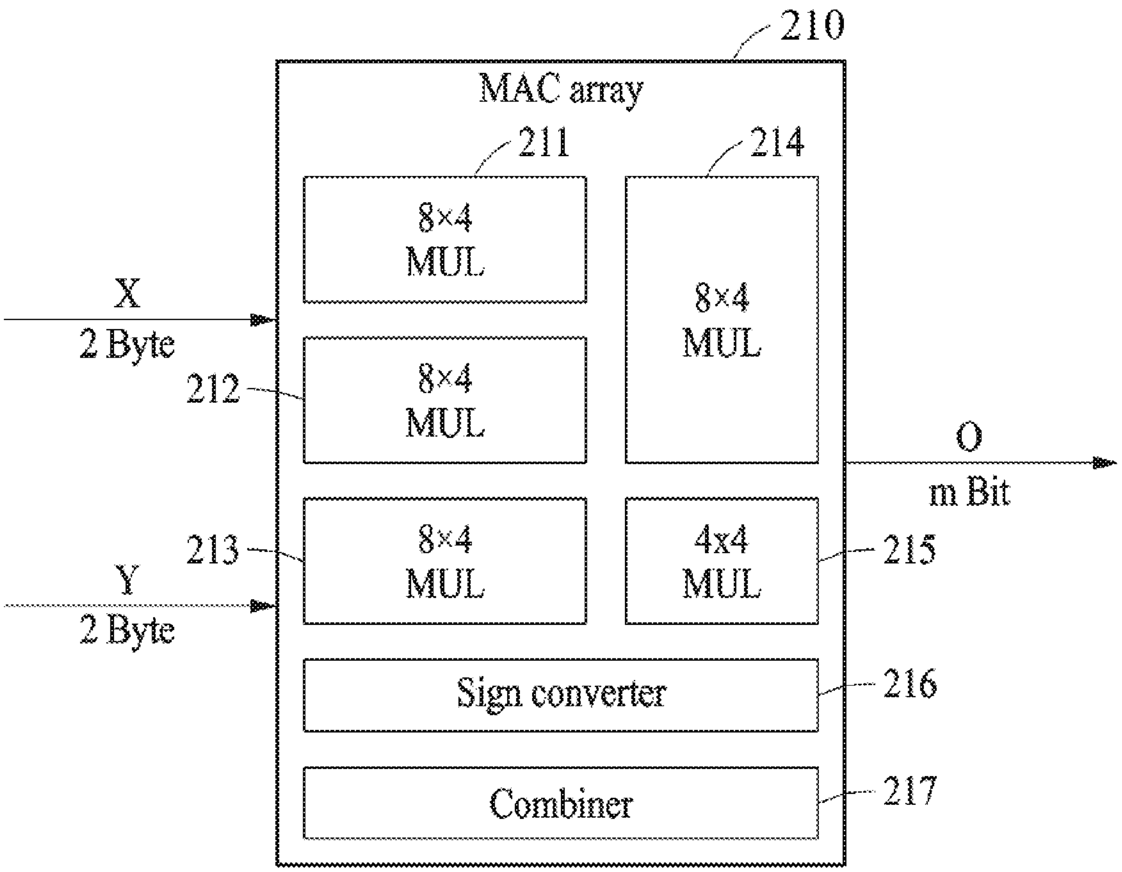
FIG. 2 is a diagram illustrating an example of a multiplier unit.

FIG. 2 is a diagram illustrating an example of a multiplier module.

Referring to FIG. 2, a multiplier module 210 (e.g., the multiplier module 131 of FIG. 1B) may be implemented as a multiplier-accumulator (MAC) array. The multiplier module 210 may include a first multiplier and a second multiplier. The first multiplier may include multipliers 211, 212, 213, and 214. The second multiplier may include a multiplier 215. The multiplier module 210 may include a sign converter 216 and a combiner 217.

The first multiplier may multiply a first bit input and a second bit input included in a plurality of data. The second multiplier may multiply a plurality of first bit inputs included in the plurality of data. The first bit input and the second bit input may differ from each other.

The sign converter 216 may convert a sign of an output of a multiplier. The combiner 217 may combine an output of the sign converter 216.

The operation apparatus 10 may perform an operation using the multiplier module 210 to support a half-precision floating point and integer 8-bit and 4-bit operations. The multiplier module 210 may include an array that includes four multipliers, for example, the multiplier 211, the multiplier 212, the multiplier 213, and the multiplier 214, each having an 8×4-bit input and a single multiplier, for example, the multiplier 215, having a 4×4-bit input. The multiplier module 210 may include the sign converter 216 configured to change a sign of a multiplication result and the combiner 217 configured to combine an operation result according to a data format as a primary adder tree.

The multiplier module 210 may receive inputs of two absolute values of 2 bytes and may perform a multiplication on 4-bit, 8-bit, 16-bit integers and a mantissa of a 16-bit floating point using four 8×4-bit multipliers 211 to 214 and a single 4×4-bit multiplier 215.

Figure 3:
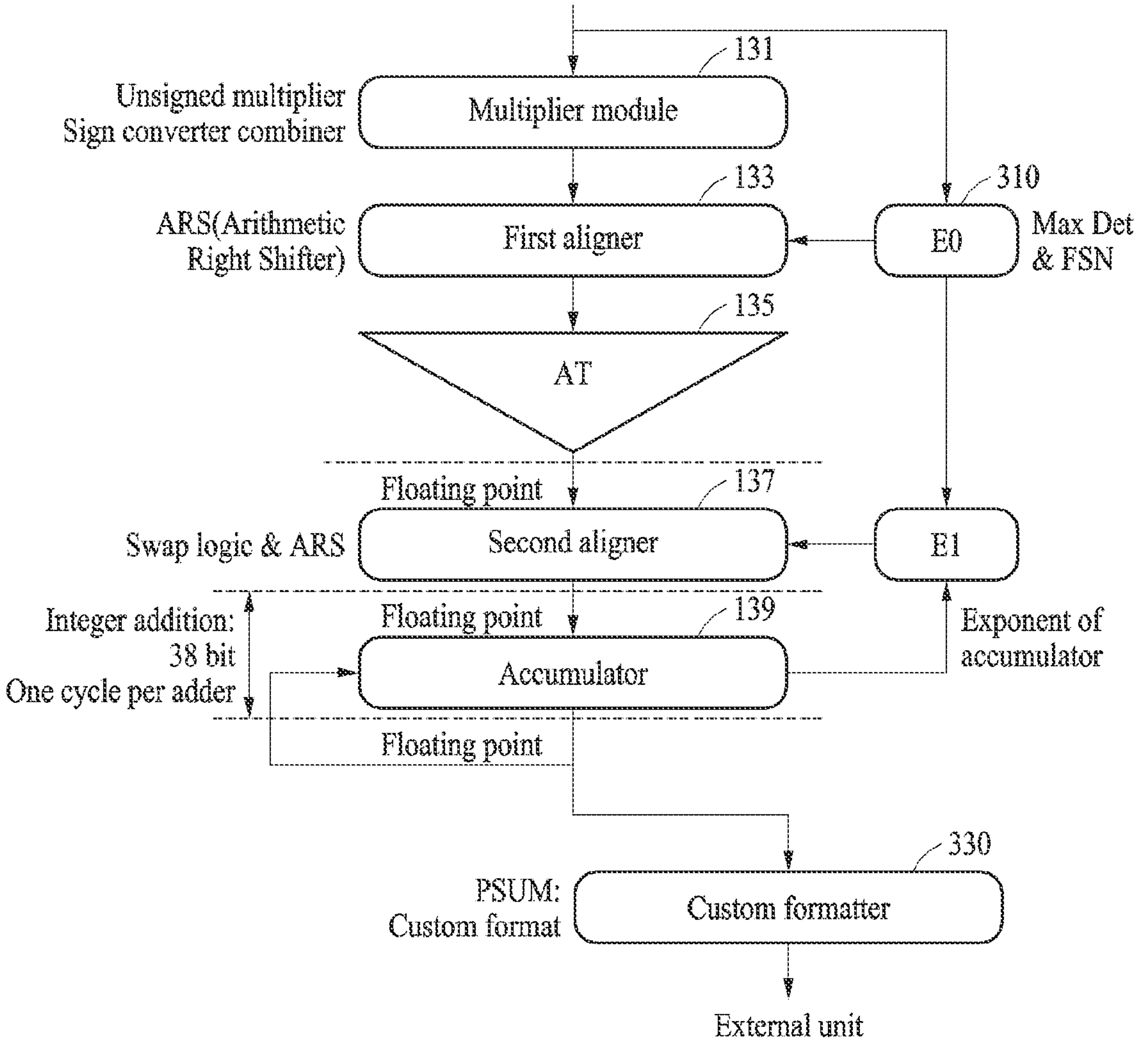
FIG. 3 illustrates an example of implementing an operation apparatus.
Figure 4:
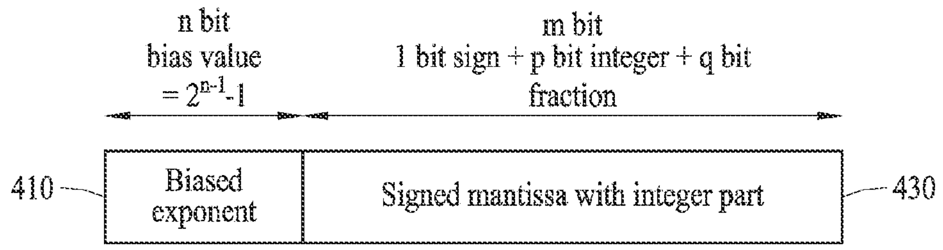
FIG. 4 illustrates an example of a custom format used by a custom formatter.

FIG. 3 illustrates an example of implementing an operation apparatus (e.g., the operation apparatus 10 of FIG. 1A), and FIG. 4 illustrates an example of custom format used by a custom formatter (e.g., a custom formatter 330 of FIG. 3).

Referring to FIGS. 3 and 4, an operation apparatus (for example, the operation apparatus 10 of FIG. 1A) may provide data hazard-free multiply-accumulation technology while supporting an operation of multi-format data.

The operation apparatus 10 may allocate an input to the same operation apparatus provided in a small scale according to a data format used for a vector input having a multi-data format.

The operation apparatus 10 may encode a multiplication result according to a sign of input data and may perform a sign extension to minimize switching. The operation apparatus 10 may combine and output an encoding result to support all of various integer-type and floating point-type data.

The operation apparatus 10 may perform a data hazard-free operation. The operation apparatus 10 of one or more embodiments may provide a feedback loop having a shorter latency and a simpler structure through a pseudo-floating addition with a fixed radix point through a global alignment and an exponent update using the second aligner 137, compared to a typical operation apparatus.

The operation apparatus 10 may provide a floating point representation in a custom format. The operation apparatus 10 may use the floating point representation including an exponent part and an encoded (e.g., may include an integer part) mantissa part. The operation apparatus 10 of one or more embodiments may reduce an operation processing time by transmitting a partial operation result to an outside and by simplifying a reloading structure.

The operation apparatus 10 may perform multiplication and accumulation operations of various lengths using unsigned multipliers of K n×m-bit inputs. The operation apparatus 10 may receive (K/2)×2n-bit and (K/2)×m-bit absolute values and a (K/2)-bit sign and may generate an m-bit output.

Each input may be routed to a plurality of small-scale multipliers according to a data format to be operated and a result of a multiplier according to a corresponding input may be encoded according to each sign and combined with outputs of a plurality of multipliers.

The operation apparatus 10 may perform a data hazard-free floating point operation. The operation apparatus 10 of one or more embodiments may simplify an alignment process by applying a custom format for independent intermediate data and by improving an operating scheme for an internal floating point operation, compared to a typical operation apparatus.

The operation apparatus 10 of one or more embodiments may achieve a data hazard-free structure through a single-cycle accumulation by performing an addition capable of responding to an overflow, by not requiring a separate normalization during an accumulation, and by enabling a small latency accumulation.

The operation apparatus 10 may fetch independent custom format data and standard floating point data. The operation apparatus 10 may store custom format data in an accumulation device and may perform multiply-accumulation on input data, may convert again an accumulation result to the custom format data, and then may transmit the custom format data to an external device.

The operation apparatus 10 may include a multiplier module 131, a first aligner 133, an exponent module 310, an adder tree (AT) 135, a second aligner 137, an accumulator 139, and a custom formatter 330.

The multiplier module 131 may support an operation on multi-format data. The operations of the multiplier module 131 may be the same as what has been described above with reference to FIG. 2

The first aligner 133 may right-shift a plurality of outputs of the multiplier module 131 according to an exponential difference.

The first aligner 133 may perform a first alignment on a multiplication result of the plurality of data based on an exponent value of the plurality of data. The first aligner 133 may shift the multiplication result based on a difference between a maximum exponent value obtained based on the exponent value and a sum of remaining exponent values.

The exponent module 310 may add exponent values of all input pairs of the multiplier module 310 and, here, may calculate and output a maximum exponent value among the exponent values and a difference between the maximum exponent value and a sum of remaining exponent values. The exponent module 310 may calculate the difference between the maximum exponent value and the sum.

The adder tree 135 may add a first alignment result. The adder tree 135 may add a right-shifted value.

The second aligner 137 may perform a second alignment on an addition result based on the exponent value and an operation result of a previous cycle. The second aligner 137 may shift the addition result based on a maximum exponent value obtained based on the exponent value and the operation result of the previous cycle.

The second aligner 137 may extend a sign bit of the plurality of data based on a predetermined radix point. The second aligner 137 may add the extended sign bit to the exponent value.

The second aligner 137 may calculate a difference between the maximum exponent value delivered from the exponent module 330 and an exponent value stored according to an operation result of a previous cycle, and may left-shift an output result of the adder tree 135 and/or an output result of the accumulator 139 having a relatively smaller exponent value between the output result of the adder tree 135 and the internal exponent result of the accumulator 139.

The accumulator 139 may accumulate a second alignment result. The accumulator 139 may perform an addition on a signed fixed decimal point with an output result of the adder tree 135 or an output result of the accumulator 360 having a relatively larger exponent value. The accumulator 139 may modify and store existing information using an addition result and the larger exponent value.

The custom formatter 330 may perform normalization on an output in which a sign bit is removed. When data being accumulated is to be delivered to an external device, the custom formatter 330 may remove a sign bit of a multiple length of k having a value of 1 or more from an accumulation value and may add a multiple value of k to an exponent value stored in the accumulator 139. The custom formatter 330 may pack the added exponent value and a signed output of the accumulator 139 subject to a coarse normalization process in which a partial sign bit is removed as a signed mantissa and may deliver the same to an external storage device.

Here, when data having the same format as one packed by the custom formatter 330 is delivered from the external device and reloaded to the accumulator 139, the second aligner 137 may perform a sign extension on the signed mantissa according to a radix point pre-specified in the accumulator 139, may perform a compensation by adding a length of an extended sign bit to the delivered exponent value, and may align an accumulation result.

An exponent value input to and output from the operation apparatus 10 may include a bias value, such as bias=$2^{(n-1)}-1$, for bit length n.

The example of FIG. 4 may represent an example of a custom format for an intermediate operation of a floating point used by the operation apparatus 10. The custom format may include a biased exponent part 410 and a signed mantissa with integer part 430. The biased exponent part 410 may indicate a n-bit biased value, for example, $2^{n-1}-1$. The signed mantissa with integer part 430 may be configured as m bits, including a first bit sign, a p bit integer, and a q bit fraction, in which n, m, p, and q denote natural number.

Figure 5:
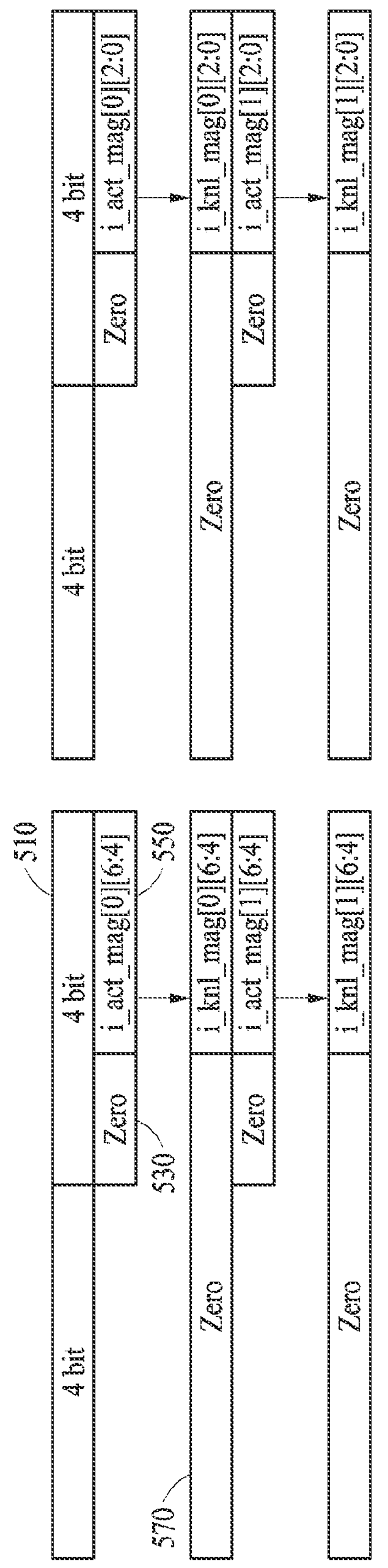
FIG. 5 illustrates an example of a scheme of routing integer 4 bits to a multiplier.
Figure 6:
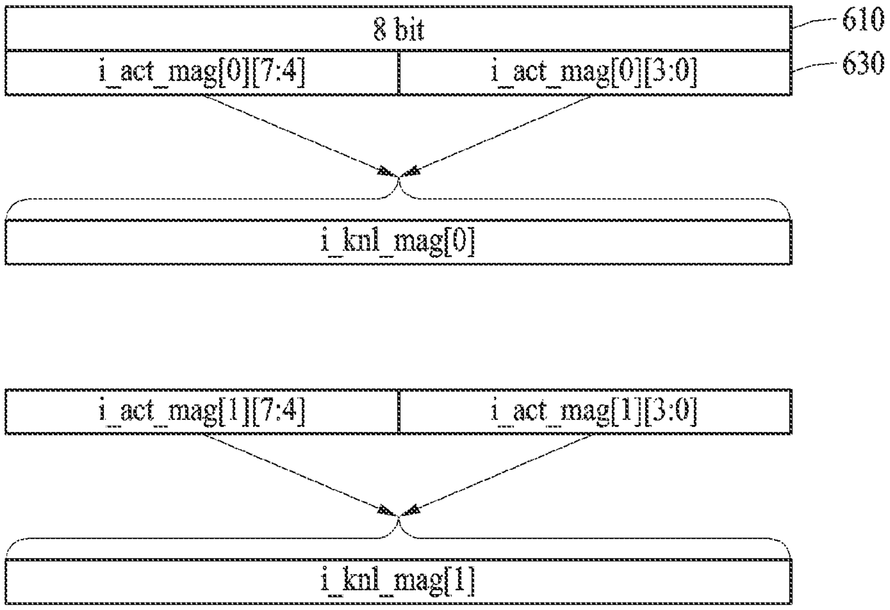
FIG. 6 illustrates an example of a scheme of routing integer 8 bits to a multiplier.
Figure 7:
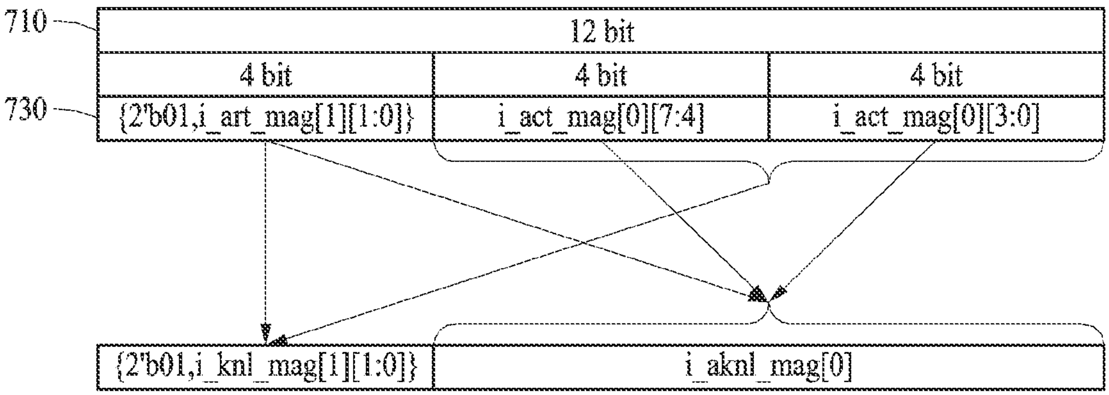
FIG. 7 illustrates an example of a scheme of routing an input to a multiplier in a case of a half-precision floating point mantissa multiplication.

FIG. 5 illustrates an example of a scheme of routing integer 4 bits to a multiplier, FIG. 6 illustrates an example of a scheme of routing integer 8 bits to a multiplier, and FIG. 7 illustrates an example of a scheme of routing an input to a multiplier in a case of a half-precision floating point mantissa multiplication.

Referring to FIGS. 5 to 7, an operation apparatus, for example, the operation apparatus 10 of FIG. 1A, may route inputs X and Y to the respective corresponding multipliers according to a defined data format among a plurality of data formats.

In the example of FIG. 5, an integer 4-bit input 510 may have a 4-bit sign-magnitude format. 8-bit inputs X and Y may be divided into four 3-bit data 550 and zero value 530 of 1 bit and zero value 570 of 5 bits may be input in advance.

In the example of FIG. 6, in an integer 8-bit input format, two 8-bit inputs X 610 may be divided into four 4-bit inputs 630 and two 8-bit inputs Y may be duplicated in two multiplications, respectively.

In the example of FIG. 7, in the case of performing a half-precision floating point mantissa multiplication, a sign bit may be ignored in an input format and an 8-bit signal and top 4 bits may be combined. In this case, an input of only a 4×4-bit multiplier may be activated. For example, a 12-bit input 710 may be divided into three 4-bit inputs 730.

Figure 8:
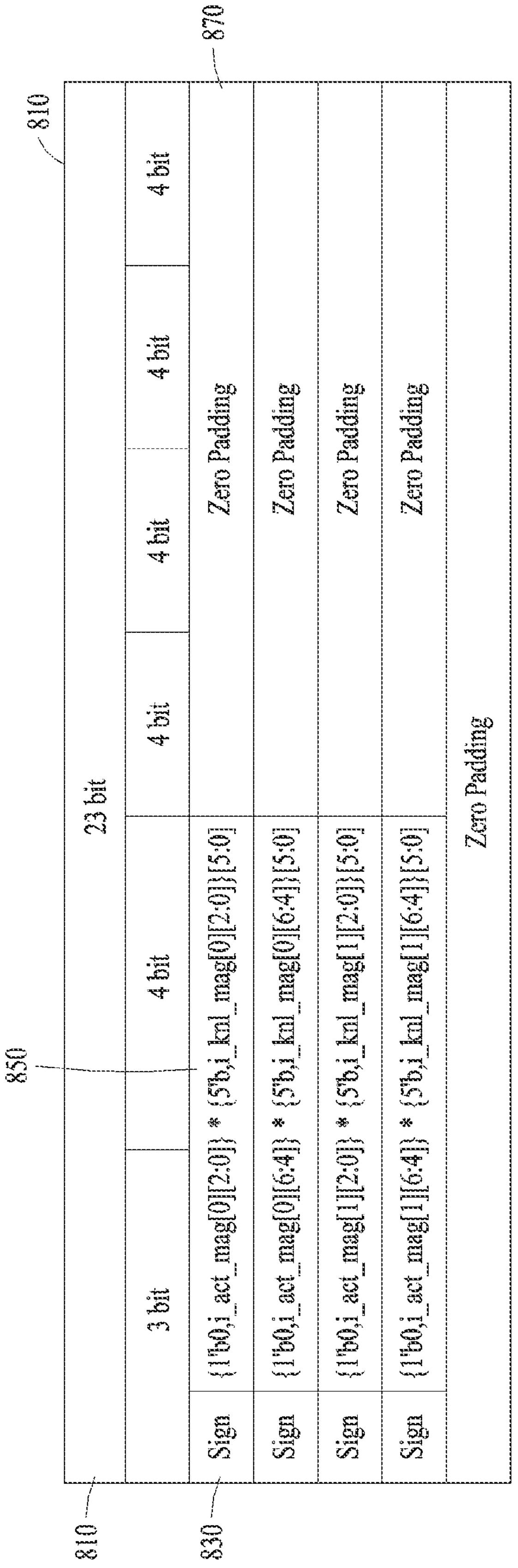
FIG. 8 illustrates an example of an output in a case of a 4-bit integer among outputs of multipliers.
Figure 9:
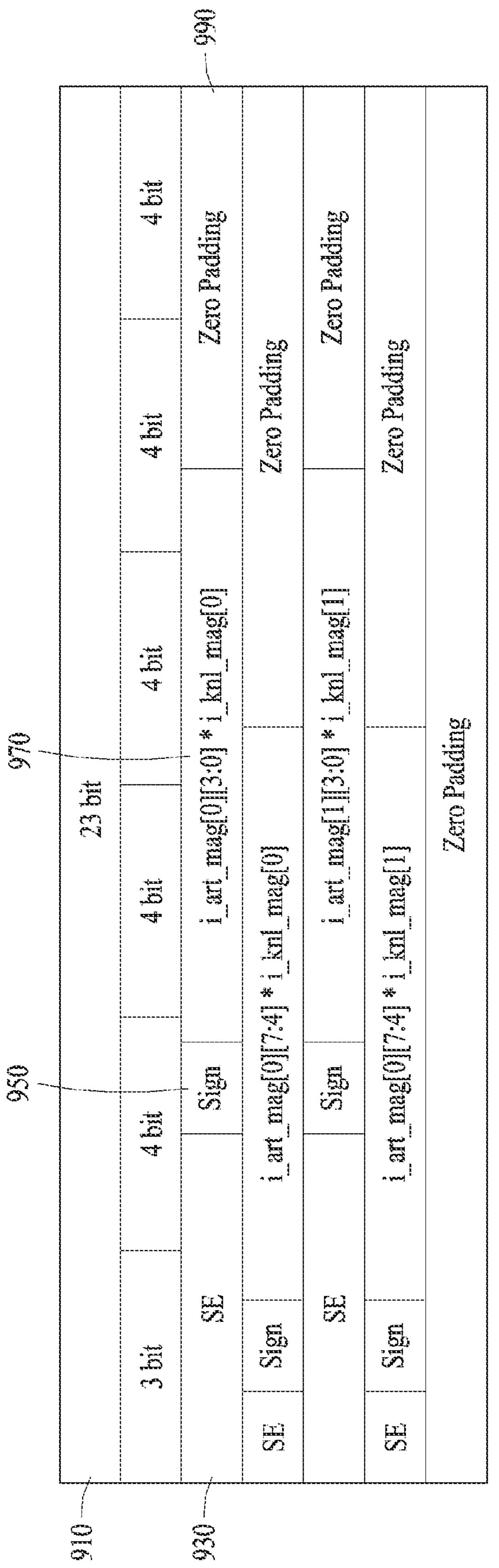
FIG. 9 illustrates an example of an output in a case of an 8-bit integer among outputs of multipliers.
Figure 10:
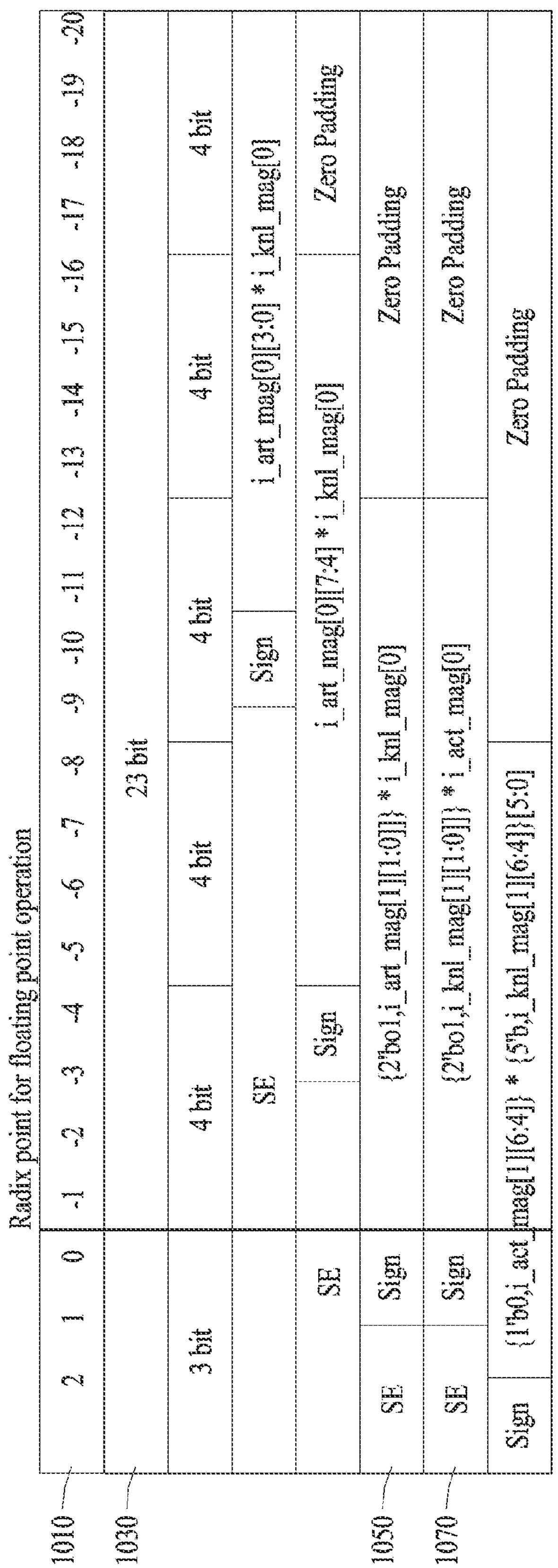
FIG. 10 illustrates an example of an output in the case of a 16-bit half-precision floating point among outputs of multipliers.

FIG. 8 illustrates an example of an output in a case of a 4-bit integer among outputs of multipliers, FIG. 9 illustrates an example of an output in a case of an 8-bit integer among outputs of multipliers, and FIG. 10 illustrates an example of an output in the case of a 16-bit half-precision floating point among outputs of multipliers.

Referring to FIGS. 8 to 10, an output of each multiplier may pass through five input combiners (e.g., a combiner including a Wallace tree or a CSA tree) according to a used data format, through an encoding device according to a sign of an input.

FIG. 8 represents a 4-bit integer format, FIG. 9 represents an 8-bit integer format, and FIG. 10 represents a 16-bit half-precision floating point format.

A combiner (e.g., the combiner 217 of FIG. 2) may use, as an input, data having formats illustrated in FIGS. 8 through 10. For example, in the example of FIG. 8, 23-bit data 810 may include single 3-bit data and five 4-bit data. The 3-bit data and the five 4-bit data may include a sign bit 830 and data 850. Four 4-bit data may be zero padding data 870. The zero padding data 870 may refer to data filled with zeros (0). The sign bit 830 may indicate a sign of data. For example, the sign bit 830 may indicate a sign value of a multiplication result.

In the example of FIG. 9, 23-bit data 910 may include single 3-bit data and five 4-bit data. The 23-bit data 910 may include a sign extension (SE) 930, a sign bit 950, data 970, and zero padding data 990. The SE 930 may refer to data filled with sign values.

In the example of FIG. 10, a radix point 1010 may refer to a point that divides an integer part and a mantissa part. 23-bit data 1030 may include single 3-bit data and five 4-bit data. In the example of FIG. 10, an SE 1050 and a sign bit 1070 may be the same as the SE 930 and the sign bit 950 of FIG. 9.

Figure 11A:
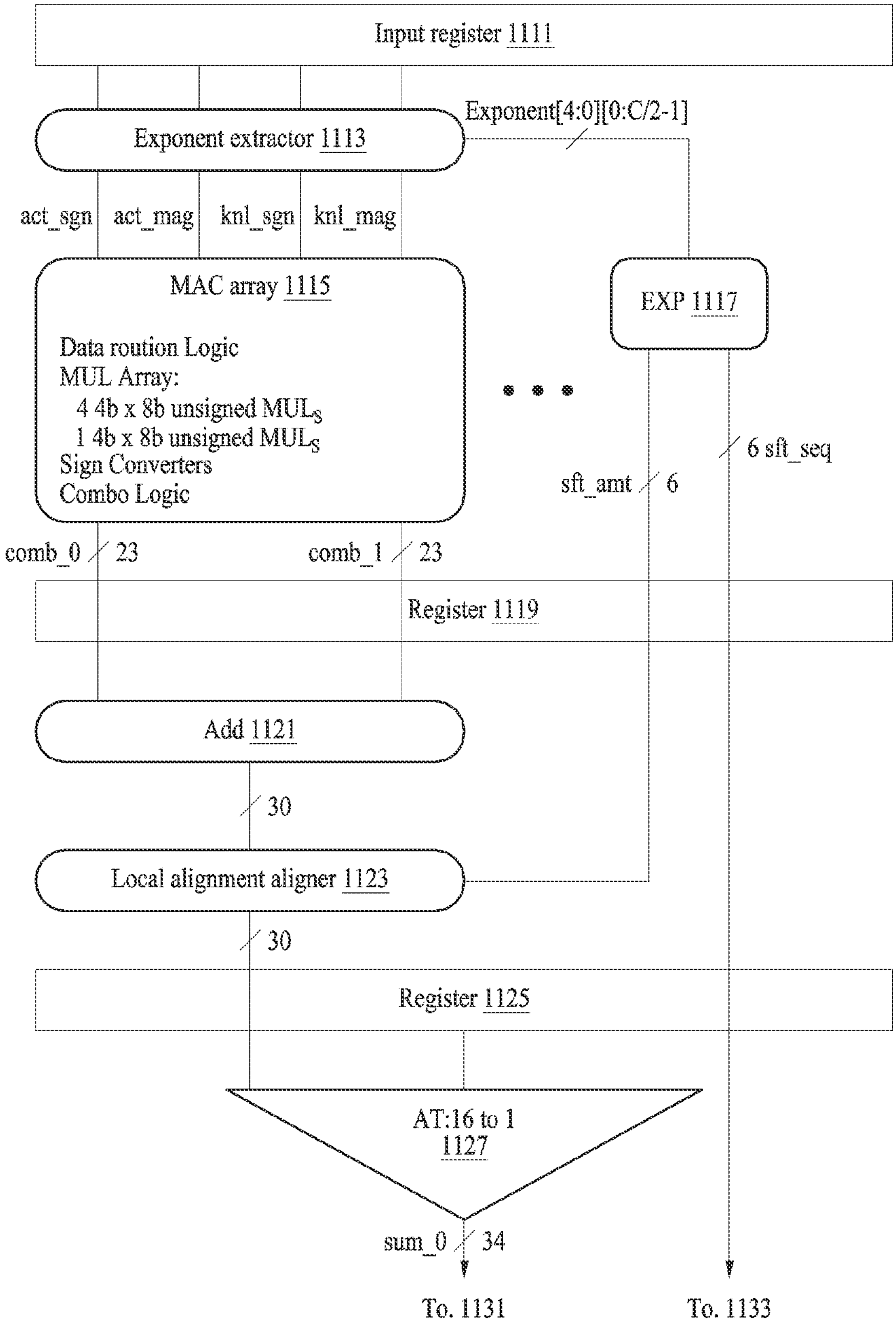
FIGS. 11A and 11B illustrate an example of implementing the operation apparatus of FIG. 3.
Figure 11B:
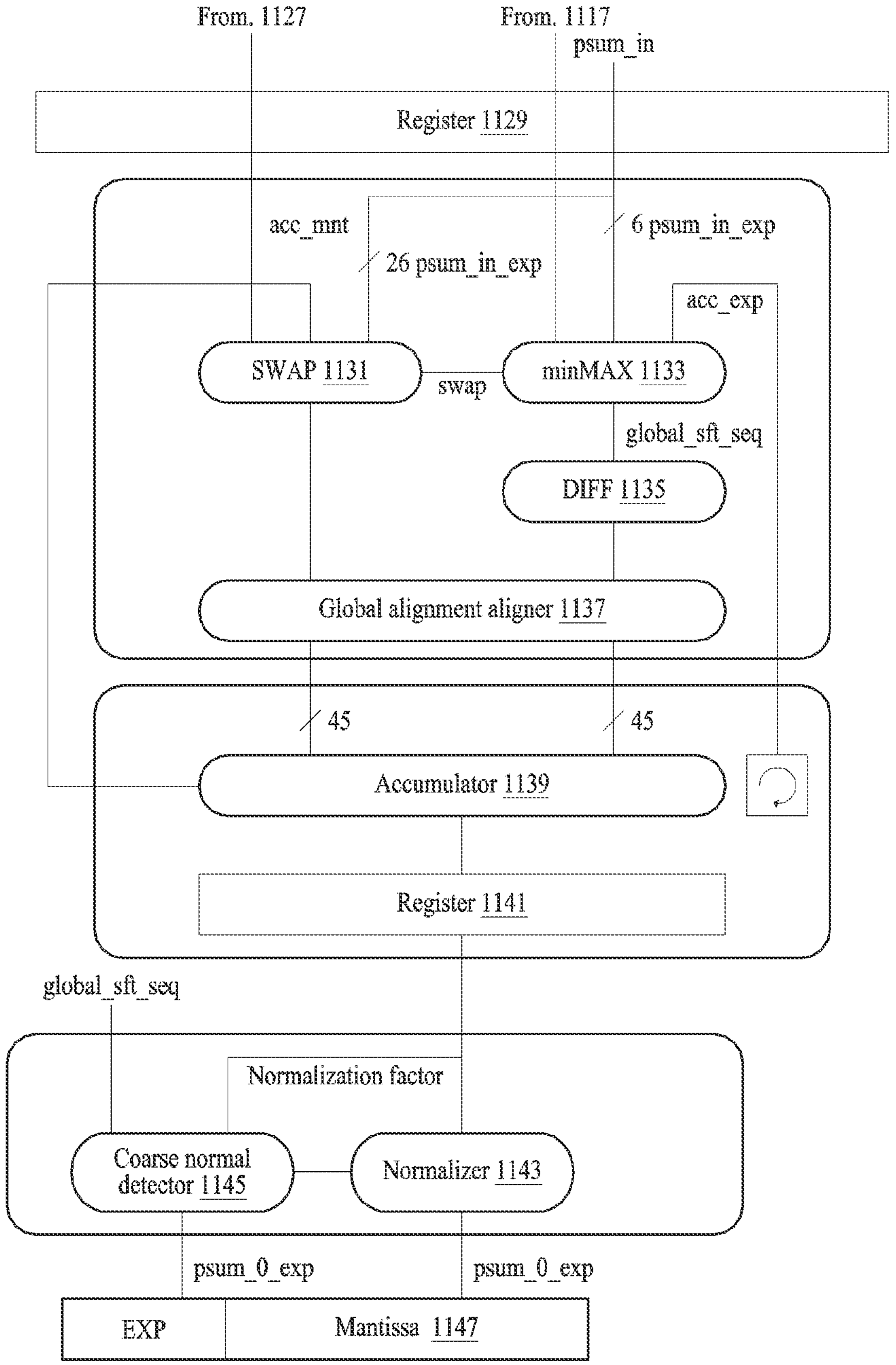

FIGS. 11A and 11B illustrate an example of implementing the operation apparatus of FIG. 3. (e.g., the operation apparatus 10 of FIG. 1A).

Referring to FIGS. 11A and 11B, the operation apparatus 10 may perform an operation on multi-format data. The operation apparatus 10 may include an input register 1111, an exponent extractor 1113, a MAC array 1115 (for example, the multiplier module 131 of FIG. 3), an exponent module (EXP) 1117 (for example, the exponent module 310 of FIG. 3), a register 1119, an adder (Add) 1121, a local aligner 1123 (for example, the first aligner 133 of FIG. 3), a register 1125, and an adder tree 1127 (for example, the adder tree 135 of FIG. 3).

The operation apparatus 10 may include a register 1129, a swap module (SWAP) 1131, a minimum/maximum extractor (min/MAX) 1133, and a difference value extractor (DIFF) 1135, a global aligner 1137 (for example, the second aligner 137 of FIG. 3), an accumulator 1139 (for example, the accumulator 139 of FIG. 3), a register 1141, a coarse normalization detector 1145, and a normalizer 1143.

The exponent extractor 1113 may extract an exponent value from input data.

The MAC array 1115 may multiply input data. The MAC array 1115 may operate in the same manner as the multiplier module 131 of FIG. 3.

The exponent module 1117 may add an exponent value extracted from the exponent extractor 1113. The exponent module 1117 may calculate a difference between a maximum exponent value among exponent values and a sum of remaining exponent values, and output the calculated difference. The exponent module 1117 may calculate an addition of an exponent part by a multiplication. For example, the exponent module 1117 may add exponent values Ea and Eb obtained from the exponent extractor 1113 based on a bias. In this example, when the bias is 1 with respect to a multiplication result, the exponent module 1117 calculate an exponent value as as Ea+Eb+1. The exponent module 1117 may output sft_seq by searching for a maximum sum. The exponent module 1117 may output 16 sft_amt by calculating a difference of the maximum sum for the local aligner 1123.

The register 1119, the register 1125, the register 1129, and the register 1141 may store therein data.

The adder 1121 may add an output of the MAC array 1115. The adder 1121 may add 7 zero bits to a tail. The local aligner 1123 may align an output of the adder 1121. The local aligner 1123 may perform an alignment in the same manner as the first aligner 133 of FIG. 1B.

The adder tree 1127 may add 16 inputs. The adder tree 1127 may operate in the same manner as the adder tree 135 of FIG. 1B. The swap module 1131, the minimum/maximum extractor 1133, and the difference value extractor 1135 may support partial loading.

The swap module 1131 may receive an output of the adder tree 1127 and replace a portion of data. The minimum/maximum extractor 1133 may extract a minimum or maximum value based on an output of the swap module 1131, an output of the exponent module 1117, and psum_in.

The global aligner 1137 may align an operation result. The global aligner 1137 may operate in the same manner as the second aligner 137 of FIG. 3.

The accumulator 1139 may accumulate an output of the global aligner 1137. The accumulator 1139 may operate in the same manner as the accumulator 139 of FIG. 3.

A subtotal generator may generate a partial sum. The subtotal generator may include the normalizer 1143 and the coarse normalization detector 1145. The normalizer 1143 may perform byte-wise shift-left. Here, a shift amount may be a multiple of 8. The coarse normalization detector 1145 may perform a reading sign detection having an encoded output. The coarse normalization detector 1145 may calculate a shift factor. For example, when a reading sign is one_pos_inc, the coarse normalization detector 1145 may calculate a shift factor as follows.

```
casex(one_pos_inc+1)
  6'b10_1???: 40;
  6'b10_0???: 32;
  6'b01_1???: 24;
  6'b01_0???: 16;
  6'b00_1???: 8;
  default: 0;
endcase
```

The coarse normalization detector 1145 may calculate a difference between a shift factor and a global shift sequence.

A final output 1147 of the operation apparatus 10 may include exp that is an exponent part and mantissa that is a mantissa part. For example, the exponent part may include 6 bits and the mantissa part may include 26 bits. Dissimilar to a standard floating point format, the mantissa part may include a hidden bit and a signed number. An exponent may be biased by 31 and, similar to the standard floating point format, a partial area may be reserved for INF, overflow, underflow, and zero.

Figure 12:
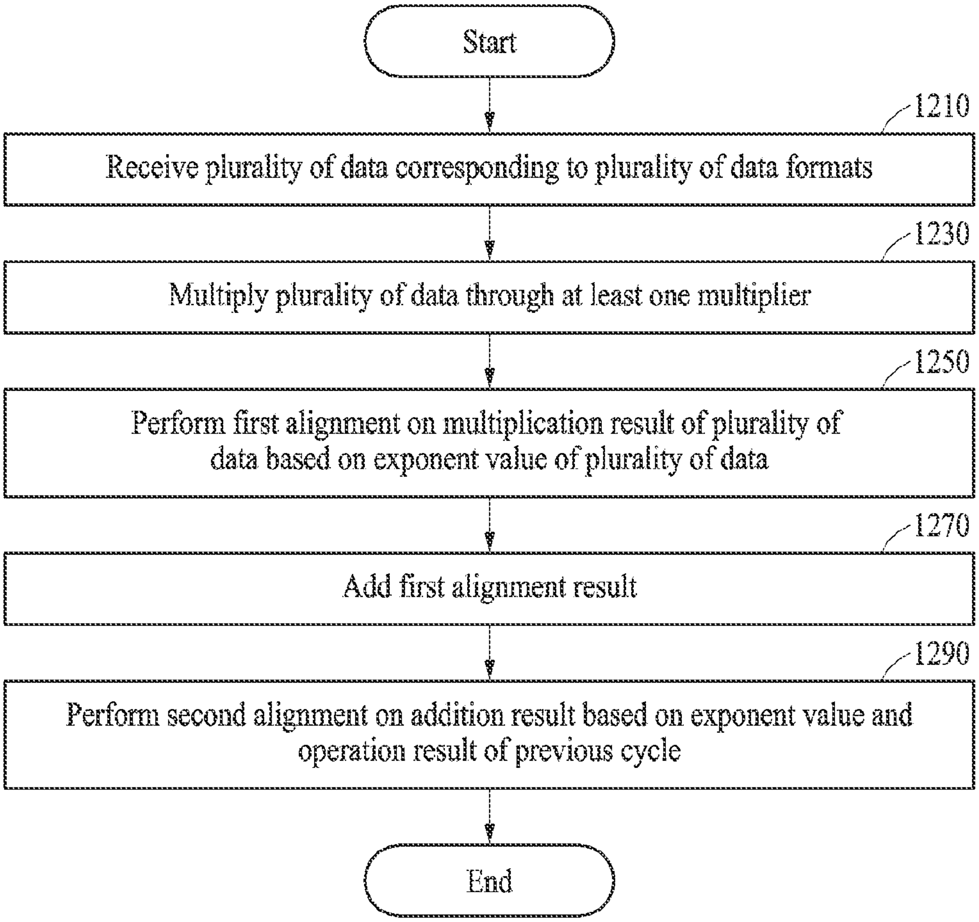
FIG. 12 is a flowchart illustrating an example of an operation method performed by an operation apparatus.

FIG. 12 is a flowchart illustrating an example of an operation method performed by an operation apparatus (e.g., the operation apparatus 10 of FIG. 1A).

Referring to FIG. 12, the operation apparatus, for example, the operation apparatus 10 of FIG. 1A, may support multi-format data.

In operation 1210, a receiver, for example, the receiver 110 of FIG. 1A, may receive a plurality of data corresponding to a plurality of data formats.

In operation 1230, a multiplier module, for example, the multiplier module 210 of FIG. 2, may multiply the plurality of data through at least one multiplier. A first multiplier, for example, the multiplier 211 of FIG. 2, may multiply a first bit input and a second bit input included in the plurality of data. A sign converter, for example, the sign converter 216 of FIG. 2, may convert a sign of a multiplication result. A combiner, for example, the combiner 217 of FIG. 2, may combine the multiplication result with a converted sign.

In operation 1250, a first aligner, for example, the first aligner 133 of FIG. 1B, may perform a first alignment on a multiplication result of the plurality of data based on an exponent value of the plurality of data. The first aligner 133 may shift the multiplication result based on a difference between a maximum exponent value obtained based on the exponent value and a sum of remaining exponent values.

In operation 1270, an adder tree, for example, the adder tree 135 of FIG. 1B, may add a first alignment result.

In operation 1290, a second aligner, for example, the second aligner 137 of FIG. 1B, may perform a second alignment on an addition result based on the exponent value and an operation result of a previous cycle. The second aligner 137 may shift the addition result based on a maximum exponent value obtained based on the exponent value and the operation result of the previous cycle. The second aligner 137 may shift the addition result based on a difference between the maximum exponent value and an exponent value stored according to the operation result of the previous cycle. The second aligner 137 may extend a sign bit of the plurality of data based on a predetermined radix point. The second aligner 137 may add the extended sign bit to the exponent value.

A second multiplier, for example, the multiplier 215 of FIG. 2, may multiply a plurality of first bit inputs.

An exponent module, for example, the exponent module 310 of FIG. 3, may add the exponent value. The exponent module 310 may obtain a maximum exponent value based on the exponent value. The exponent module 310 may calculate a sum of remaining exponent values. The exponent module 310 may calculate a difference between the maximum exponent value and the sum.

An accumulator, for example, the accumulator 139 of FIG. 1B, may accumulate a second alignment result.

A custom formatter, for example, the custom formatter 330, may remove a sign bit with a predetermined length from an output of the accumulator. The custom formatter 330 may perform normalization on an output in which the sign bit is removed.

The operation apparatuses, receivers, processors, memories, multiplier modules, first aligners, adder trees, second aligners, accumulators, multipliers, sign converters, combiners, exponent modules, custom formatters, input registers, exponent extractors, MAC arrays, registers, adders, local alignment modules, swap modules, minimum/maximum extractors, difference value extractors, global aligners, coarse normalization detectors, normalizers, operation apparatus 10, receiver 110, processor 130, memory 150, multiplier module 131, first aligner 133, adder tree 135, second aligner 137, accumulator 139, multiplier module 210, multiplier 211, multiplier 212, multiplier 213, multiplier 214, multiplier 215, sign converter 216, combiner 217, multiplier module 310, first aligner 320, exponent module 330, adder tree (AT) 340, second aligner 350, accumulator 360, custom formatter 370, input register 1111, exponent extractor 1113, MAC array 1115, exponent module (EXP) 1117, register 1119, adder (Add) 1121, local alignment module 1123, register 1125, adder tree 1127, register 1129, swap module (SWAP) 1131, minimum/maximum extractor (min/MAX) 1133, difference value extractor (DIFF) 1135, global aligner 1137, accumulator 1139, register 1141, coarse normalization detector 1145, normalizer 1143, and other apparatuses, devices, units, modules, and components described herein with respect to FIGS. 1-12 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-12 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. An apparatus with multi-format data support, the apparatus comprising:
- a receiver configured to receive a plurality of data corresponding to a plurality of data formats; and
- one or more processors comprising:
  - one or more multipliers configured to multiply a plurality of input pairs of the plurality of data;
  - a first aligner configured to perform a first alignment on results of the multiplication based on a maximum exponent value among sums of exponent values of the plurality of input pairs and respective remaining sums of exponent values of the plurality of input pairs;
  - an adder tree configured to add results of the first alignment; and
  - a second aligner configured to perform a second alignment on a result of the addition based on the maximum exponent value and an operation result of a previous cycle.

2. The apparatus of claim 1, wherein, for the multiplying, the one or more multipliers are configured to:
- multiply a first bit input and a second bit input included in the plurality of data;
- convert a sign of a result of the multiplication of the first bit input and the second bit input; and
- combine the result of the multiplication of the first bit input and the second bit input with the converted sign to generate the result of the multiplying of the plurality of data.

3. The apparatus of claim 2, wherein, for the performing of the second alignment, the second aligner is configured to shift the result of the addition based on a maximum exponent value obtained based on an exponent value and the operation result of the previous cycle.

4. The apparatus of claim 3, wherein, for the shifting of the result of the addition, the second aligner is configured to shift the result of the addition based on a difference between the maximum exponent value and an exponent value stored according to the operation result of the previous cycle.

5. The apparatus of claim 1, wherein, for the multiplying, the one or more multipliers are configured to multiply a plurality of first bit inputs of the plurality of data.

6. The apparatus of claim 1, wherein, for the performing of the first alignment, the one or more-processors-are-first aligner is configured to shift the results of the multiplication based on the respective differences between the maximum exponent value and the respective remaining sums of exponent values.

7. The apparatus of claim 1, wherein, for the performing of the second alignment, the second aligner is configured to:
- extend a sign bit of the plurality of data based on a predetermined radix point; and
- add the extended sign bit to an exponent value.

8. The apparatus of claim 1, wherein the one or more processors comprise an accumulator configured to accumulate a result of the second alignment.

9. The apparatus of claim 8, wherein the one or more processors comprise a custom formatter configured to:
- remove a sign bit with a predetermined length from an output of a result of the accumulation; and
- perform normalization on the output in which the sign bit is removed.

10. The apparatus of claim 1, wherein the one or more multipliers are configured to multiply the plurality of input pairs, and wherein the one or more multipliers comprise four multipliers each having an 8×4-bit input and a single multiplier having a 4×4-bit input to perform unsigned multiplication on 4-bit, 8-bit, and 16-bit integers and a mantissa of a 16-bit floating point number.

11. A processor-implemented method with multi-format data support, the method comprising:

using a receiver, receiving a plurality of data corresponding to a plurality of data formats;

using one or more multipliers, multiplying a plurality of input pairs of the plurality of data;

using a first aligner, performing a first alignment on results of the multiplication of the plurality of data based on a maximum exponent value among sums of exponent values of the plurality of input pairs and respective remaining sums of exponent values of the plurality of input pairs;

an adder tree, adding results of the first alignment; and using a second aligner, performing a second alignment on a result of the addition based on the maximum exponent value and an operation result of a previous cycle.

12. The method of claim 11, wherein the multiplying comprises:

multiplying a first bit input and a second bit input included in the plurality of data;

converting a sign of a result of the multiplication of the first bit input and the second bit input; and combining the result of the multiplication of the first bit input and the second bit input with the converted sign to generate the result of the multiplying of the plurality of data.

13. The method of claim 11, wherein the multiplying comprises multiplying a plurality of first bit inputs of the plurality of data.

14. The method of claim 11, wherein the performing of the first alignment comprises shifting the results of the multiplication based on the respective differences between the maximum exponent value and the respective remaining sums of exponent values.

15. The method of claim 11, wherein the performing of the second alignment comprises shifting the result of the addition based on the maximum exponent value obtained based on an exponent value and the operation result of the previous cycle.

16. The method of claim 15, wherein the shifting of the result of the addition comprises shifting the result of the addition based on a difference between the maximum exponent value and an exponent value stored according to the operation result of the previous cycle.

17. The method of claim 11, wherein the performing of the second alignment comprises:

extending a sign bit of the plurality of data based on a predetermined radix point; and adding the extended sign bit to the exponent value.

18. The method of claim 11, further comprising accumulating a result of the second alignment.

19. The method of claim 18, further comprising:

removing a sign bit with a predetermined length from an output of a result of the accumulation; and performing normalization on the output in which the sign bit is removed.

20. A non-transitory computer-readable storage medium storing instructions that, when executed by one or more processors, configure the one or more processors to perform the method of claim 11.

* * * * *